United States Patent
Zeuch et al.

[11] 3,981,196
[45] Sept. 21, 1976

[54] APPARATUS FOR TEMPERATURE MEASUREMENT

[75] Inventors: Klaus Zeuch, Eckental; Josef Stadter, Erlangen, both of Germany

[73] Assignee: Siemens Aktiengesellschaft, Munich, Germany

[22] Filed: Mar. 24, 1975

[21] Appl. No.: 561,342

[30] Foreign Application Priority Data
Mar. 27, 1974  Germany............................ 2414888

[52] U.S. Cl............................. 73/343 B; 23/273 SP; 73/354; 156/601; 236/15 B
[51] Int. Cl.²...................... F27D 21/00; G01K 1/14
[58] Field of Search.......... 73/52, 29, 343 R, 343 B, 73/354; 252/62.3 GA; 236/15 B; 423/299; 23/273 SP; 156/601, 616 R, 616 A

[56] References Cited
UNITED STATES PATENTS

| | | |
|---|---|---|
| 2,688,876 | 9/1954 | Barnes .............................. 73/343 R |
| 2,862,787 | 12/1958 | Seguin et al. ................... 423/299 X |
| 3,092,591 | 6/1963 | Jones et al. ............. 252/62.3 GA X |
| 3,305,313 | 2/1967 | Sirgo et al. ............... 252/62.3 GA X |
| 3,481,711 | 12/1969 | Maruyama....................... 23/273 SP |
| 3,704,093 | 11/1972 | Haggerty et al. .................... 423/299 |
| 3,712,110 | 1/1973 | Paulik et al. ......................... 73/15 B |
| 3,884,642 | 5/1975 | Benedict.......................... 23/273 SP |

*Primary Examiner*—Richard C. Queisser
*Assistant Examiner*—Frederick Shoon
*Attorney, Agent, or Firm*—Kenyon & Kenyon Reilly Carr & Chapin

[57] ABSTRACT

Apparatus for measuring the temperature of a granular semiconductor material of the type which is evaporated when manufacturing a semiconductor such as gallium phosphide within an ampoule or reaction tube, in which a temperature sensor is installed in a measuring tube having a closed end extending into the ampoule and the semiconductor material therein and an opened end which is sealed into a suitable opening in the end of the ampoule with the electrical leads for the temperature sensor being brought out from the measuring tube through the opening in the ampoule.

5 Claims, 1 Drawing Figure

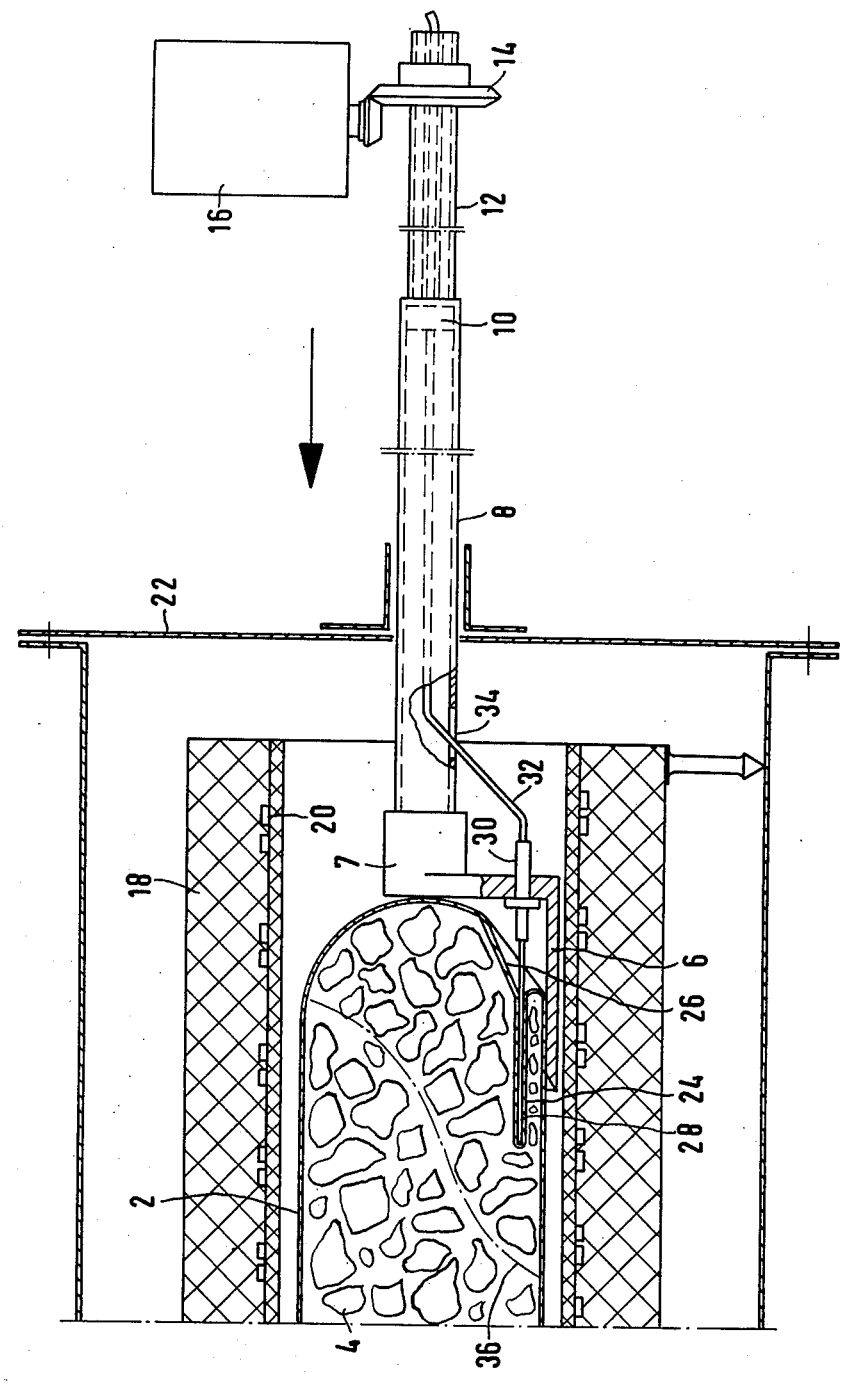

APPARATUS FOR TEMPERATURE MEASUREMENT

BACKGROUND OF THE INVENTION

This invention relates to apparatus for the preparation of semiconductor material in general and more particularly to a temperature measuring arrangement for use in measuring the temperature of a granular semiconductor material which is being evaporated within an ampoule for the formation of semiconductor material.

It is well known that dense polycrystalline gallium phosphide can be produced from the two components at a reaction temperature of 1450°C by heating gallium in a closed tube and passing vaporous phosphorus through holes in the tube wall to the area of the heated gallium whereupon it will react to form gallium phosphide. In such a method the gallium is advanced at a comparatively low travel speed of approximately 1 cm/hr through a heating zone to result in gallium phosphide which contains a carbon content of approximately 1000 ppm. In such an arrangement the operating pressure of the installation, which is essentially determined by the vapor pressure of the phosphorus, amounts to approximately 8–10 atm. [See J. Cryst, Growth 3,4 286 (1968)]. Another known method for the direct synthesis of polycrystalline gallium phosphide using gallium and phosphorus at a temperature of about 1500°C and a pressure of 6–35 bar is disclosed by Frosch and Derick in Journal of the Electrochemical Society, Vol. 108, p. 251, 1961. The components of the semiconductor compound are placed in a quartz tube or ampoule which is arranged in a furnace and is provided with a high frequency heating device. The high frequency heating device is inductively coupled to a graphite boat located in the tube and containing one of the components, e.g. gallium. The phosphorus is placed at the end of the ampoule with the space containing the phosphorus closed off with quartz wool or the like to permit the phosphorus vapor to reach the gallium. Typically, this phosphorus vapor is produced at a temperature of about 480°–580°C. The pressure within the ampoule in this horizontal system depends on the temperature and can vary between 6 and 35 atm. The quartz ampoule is installed within an autoclave which has an elevated pressure therein which is ideally at the operating pressure of the phosphorus in the ampoule. By thus applying an external pressure to the walls of the ampoule the internal pressure of the phosphorus is counteracted and only a small differential pressure results. As a result the quartz ampoule need not be designed for a large pressure differential. For reacting, the boat with the semiconductor component such as gallium is moved through the inductively heated zone of elevated temperature within the heating device. The portion of the ampoule containing the phosphorus is typically installed within an oven which raises it to the evaporation temperature. Through this apparatus a dense gallium phosphide which will contain a small piece of gallium after the process is ended is formed.

In the direct synthesis of a semiconductor compound, made up of one component having a substantially higher partial pressure than the other or others, phosphorus and arsenic are suitable, for example, as the components with the high partial vapor pressure. For reaction therewith the components, gallium and indium are suitable. For the production of gallium phosphide, operation will typically be in a temperature range of 1000°–1400°C and preferably at 9–10 atm. The boat containing the gallium is generally made of graphite and may also be made of boron nitride or quartz.

The quartz ampoule is generally used for a single synthesis. A direct measure of the operating pressure within the quartz ampoule using a pressure measuring device and the necessary associated pressure-tight sealed feedthroughs becomes comparatively expensive. Because the vapor pressure of the phosphorus varies directly as a function of temperature in a well known manner, the operating temperature within the ampoule will essentially correspond to the vapor pressure of the phosphorus. The phosphorus vapor temperature can be determined indirectly by determining the temperature of the granular phosphorus. There is a problem, however, in that the temperature of the phosphorus is determined not only by the temperature of the heating device, i.e. the oven surrounding it, but is also a function of the radiation heat generated from the boat, and which is raised to a temperature within the reaction range of the gallium phosphide synthesis and is, thus, much higher than the phosphorus temperature. Furthermore, the wall of the ampoule also radiates heat. This radiated heat is further increased by the fact that the end of the ampoule typically rests on a spoon-shaped support normally consisting of a metal such as stainless steel. As a result the determination of the phosphorus temperature through measurement of the ampoule wall is not possible.

In view of these difficulties the need for an arrangement which permits accurately determining the temperature of the evaporating semiconductor material and which can then be used to regulate the pressure and which measurement means can be installed independent of the ampoule used in the synthesis becomes evident.

SUMMARY OF THE INVENTION

The present invention solves this problem. To do this a temperature sensor is installed within a measuring tube which extends into the ampoule and into the phosphorus or other material contained therein. The closed end of the small measuring tube is located inside the ampoule at a position where the phosphorus is placed. The open end of the measuring tube is sealed to the wall of the ampoule at a hole provided for that purpose. At this point the open end of the measuring tube is present and permits insertion of a thermocouple or the like and the electrical leads extending therefrom. As disclosed, in connection with the horizontal synthesis system, the ampoule rests on one end with the other end on a support piece. In this arrangement, the closed end of the measuring tube preferably extends in the axial direction of the ampoule beyond the support piece so as not to be affected by radiation therefrom. This permits it to give a more accurate reading of the actual phosphorus temperature. With this arrangement, the temperature of the phosphorus and from that temperature the operating pressure of the reaction which is essentially the vapor pressure of the phosphorus can be determined directly.

As disclosed it is particularly advantageous that the temperature be measured in a manner such that the temperature value is converted into an electrical quantity which can be used as an actual value for a control device regulating temperature within the ampoule, and also as an actual value input to a device controlling the pressure within the autoclave.

In accordance with the embodiment illustrated, the temperature measuring apparatus comprises a measuring tube extending in the axial direction of the ampoule. The measuring tube extends from a hole in the wall of the ampoule with its closed end projecting into the phosphorus granules. At its open end it has a funnel shaped widened connecting portion mating with the front wall of the ampoule. This permits easy insertion of the temperature sensor and electrical leads. As shown, this portion of the apparatus, i.e. the temperature sensor and leads, are preferably attached to the support spoon on which the ampoule rests so that as the ampoule is inserted into the apparatus, the temperature sensor and its wires can be easily slid into the measuring tube. Thus, the sensor and its leads should be essentially rigid but with enough resilience to permit a small amount of movement to adjust to slight differences in the measuring tube location. In the preferred embodiment, the measuring sensor is an encased thermocouple. It can also equally well be an appropriately designed resistance measuring device, e.g. a thermistor.

The measuring apparatus of the present invention can be used in a synthesis system in which the heating devices are stationary and the ampoule moves. In such a case, the temperature sensor of course moves with the ampoule. A system of this nature is described in detail in U.S. application Ser. Nos. 599,014 and 599,015 both filed on even date herewith and assigned to the same assignee as the present inventor. It can be used in other similar arrangements in which the ampoule is moved. However, it can also be used in systems where the ampoule is held still while the heating units are moved. Such is disclosed in detail in applicaton Ser. No. 559,016 filed on even date herewith and assigned to the same assignee as the present invention.

The temperature measuring apparatus of the present invention is also usable in a synthesis system operating without a support pressure being applied to the outer walls of the ampoule i.e. one without an autoclave. In such a case, the measuring tube and its seal at the end of the ampoule wall must be constructed to withstand the operating pressure of the system and have adequate mechanical stability.

BRIEF DESCRIPTION OF THE DRAWINGS

The single FIGURE is a view, partially in cross section, of one end of a synthesis apparatus having the temperature measuring apparatus of the present invention installed.

DETAILED DESCRIPTION OF THE PREFERRED EMBODIMENT

FIG. 1 illustrates one end, i.e. the front end or the gallium phosphorus end, of a synthesis apparatus such as that disclosed in the three copending applications referenced above. As illustrated, the end of a reaction ampoule 2 containing granular phosphorus 4 is disposed within a hollow cylindrical shaped oven 18 and is supported on a spoon shaped support means 6. The support piece 6 is coupled through an appropriate mechanical coupling arrangement 7 to a push rod 8. At the end of the push rod 8 is a gasket 10 for sealing purposes with the push rod connected through a spindle 12 and a set of gears 14 to a drive motor 16. Drive motor 16 will preferably be a speed controllable drive motor. As more fully explained in the above-referenced applications, this drive system is used for advancing the ampoules, and particularly for advancing the gallium boat contained at the other end of the ampoule, through the highly heated reaction zone. Furthermore, although the system where the ampoule is advanced is shown, it will be recognized that the apparatus shown herein can be equally well applied to an arrangement such as that disclosed in application Ser. No. 559,016 in which the heating systems are moved instead. Heating unit or oven 18 contains a heater helix 20 which will preferably be bifilar wound. The oven, ampoule and the rest of the associated apparatus are installed within an autoclave 22. In conventional fashion, the push rod 8 is brought through the end wall of the autoclave 22 in a pressure tight manner.

To permit carrying out the necessary temperature measurement according to the present invention, a measuring tube 24 extends axially into the ampoule 2. The inner end of the measuring tube 24 is sealed and extends into the granular phosphorus 4. As illustrated, the end extends beyond the axial length of the support spoon 6. At the point where the tube 24 mates with and is sealed in the end of the ampoule 2 an intermediate connecting portion 26 which is essentially conical is formed. A temperature sensor 28 is arranged within the measuring tube 24 at its inner end. As a result, this temperature sensor, which will be of small axial length, will be within the phosphorus beyond the point where it will be affected by any heat radiation or conduction from the spoon 6. In addition, it is far enough from the wall of the ampoule that heating of the wall, which may be greater than that of the phosphorus inside, will not have any substantial effect. The temperature sensor which will preferably be a thermocouple or a thermal resistor and its leads are provided with a casing and constructed in a rod shaped form. The rod is attached to the holding device 7 for the support spoon. As illustrated, the end of the rod can be provided with a cylindrical casing which is inserted through an appropriate hole in the holding device 7. The casing of the device is continued as a casing 32 enclosing the leads of the measuring sensor 28 and is preferably led through a bore 34 formed in the push rod 8. It then is brought out of the apparatus through the spindle 12 which is made hollow for that purpose. The lead may then be connected to an appropriate indicating or control apparatus and used to regulate both the pressure within the autoclave 22 and the temperature of the phosphorus through control of the heating oven 18.

Since the internal pressure of the ampoule corresponds essentially to the phosphorus vapor pressure, the temperature value measured by the temperature sensor 28 can be used as the actual value for an automatic pressure control for autoclave. In this manner, the pressure control can cause the external pressure on the ampoule to be precisely adjusted to the operating pressure within the ampoule. Furthermore the measuring sensor 28 can also be used to provide an output for a proportional integral temperature controller controlling the phosphorus oven 18 so that the phosphorus will be maintained at the desired temperature. The manner in which the output of the measuring sensor can be used for control purposes is more fully described in application Ser. No. 561,341 filed on even date herewith and assigned to the same assignee as the present invention. As illustrated, it is preferable that the measuring tube 28 be located eccentrically in the lower portion of the ampoule. In the reaction process, reaction will typically take place in the upper portion of the phosphorus so that the surface of the remaining phosphorus will take the shape shown by the dot-dash line 36 of the FIGURE. In this manner, the measuring tube 24 will always be in intimate contact with the remaining phosphorus and will be operable over the entire drawing process.

The temperature gradient between the temperature sensor 28 and the phosphorus 4 is negligible particularly since the inside of the diameter of the measuring tube can be kept comparatively small. This diameter will generally be only a few millimeters, e.g. 3–5 mm. The outside diameter will also be only 3–6 mm and even in exceptional cases will not exceed 6–10 mm.

After the insertion of the ampoule into the apparatus, i.e. over to the spoon 6 with the temperature sensor 28 being pushed into the measuring tube 24, the drive 16 will drive the push rod 8 pushing the ampoule 2 through the reaction zone and at the same time moving the temperature sensor along with it. After completion of the synthesis, the push rod 8 and holding device are moved back to the starting position where they are then ready for use with the next reaction ampoule.

Thus an improved temperature apparatus for use in a reaction ampoule in which a synthesis of a semiconductor is being carried out has been shown. Although a specific embodiment has been illustrated and described, it will be obvious to those skilled in the art that various modifications may be made without departing from the spirit of the invention which is intended to be limited solely by the appended claims.

What is claimed is:

1. Apparatus for the temperature measurement of a granular semiconductor material which is evaporated in an ampoule supported along an axis of symmetry having two closed end walls arranged in an autoclave with the counter pressure of the autoclave controlled as a function of the vapor pressure of the semiconductor material, in particular in such apparatus for the production of a semiconductor compound, one component of which possesses a significantly higher vapor pressure than the other or others, comprising: a measuring tube with a diameter much smaller than that of the ampoule inserted through and sealed into one of said end walls of the ampoule eccentric to said axis of the ampoule near its bottom so that its closed end is located in and surrounded by the granular semiconductor material being evaporated therein and with its open end at the outside surface of the wall of said ampoule so as to permit insertion of a temperature sensor therein; and a temperature sensor having leads inserted into the closed end of said measuring tube with said leads extending from the open end thereof.

2. Apparatus according to claim 1 wherein said ampoule rests on a support piece and wherein the closed end of said measuring tube extends axially beyond the end of said support piece.

3. Apparatus as in claim 2 wherein said measuring tube extends in the axial direction of the ampoule and wherein its open end is provided with a conically shaped expanded intermediate portion at the point where it meets the wall of the ampoule.

4. Apparatus according to claim 2 and further including a casing enclosing said temperature sensor and its connecting leads and wherein said casing is fastened to a holding device for said support piece.

5. Apparatus as in claim 1 wherein said measuring tube extends in the axial direction of the ampoule and wherein its open end is provided with a conically shaped expanded intermediate portion at the point where it meets the wall of the ampoule.

* * * * *